(12) United States Patent
Moon et al.

(10) Patent No.: US 10,027,437 B2
(45) Date of Patent: Jul. 17, 2018

(54) MODE-MULTIPLEXING CONTROL METHOD, AND TRANSMISSION APPARATUS AND RECEPTION APPARATUS FOR THE SAME

(71) Applicant: ELECTRONICS AND TELECOMMUNICATIONS RESEARCH INSTITUTE, Daejeon (KR)

(72) Inventors: Sang Rok Moon, Daejeon (KR); Changyo Han, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/471,064

(22) Filed: Mar. 28, 2017

(65) Prior Publication Data

US 2017/0373787 A1 Dec. 28, 2017

(30) Foreign Application Priority Data

Jun. 24, 2016 (KR) .................. 10-2016-0079583
Nov. 29, 2016 (KR) .................. 10-2016-0159928

(51) Int. Cl.
*H04B 10/08* (2006.01)
*H04J 14/04* (2006.01)
*H04B 10/079* (2013.01)

(52) U.S. Cl.
CPC .......... *H04J 14/04* (2013.01); *H04B 10/0795* (2013.01)

(58) Field of Classification Search
CPC .. H04J 14/04; H04J 14/0227; H04B 10/0795; H04B 10/0793; H04B 10/00
USPC .............. 398/25, 33, 34, 43, 44, 68, 79, 200
See application file for complete search history.

(56) References Cited

U.S. PATENT DOCUMENTS

| | | | |
|---|---|---|---|
| 6,400,750 | B1 | 6/2002 | Lee et al. |
| 9,225,461 | B2 | 12/2015 | Koebele et al. |
| 2008/0192681 | A1 | 8/2008 | Lee et al. |
| 2011/0271168 | A1 | 11/2011 | Han et al. |
| 2015/0381284 | A1* | 12/2015 | Maejima ............... H04B 10/564 398/25 |

FOREIGN PATENT DOCUMENTS

KR 10-2009-0116596 A 11/2009
KR 10-2016-0050687 A 5/2016

* cited by examiner

*Primary Examiner* — M. R. Sedighian
(74) *Attorney, Agent, or Firm* — LRK Patent Law Firm

(57) ABSTRACT

A mode-multiplexing control method, and a transmission apparatus and reception apparatus for the same, the mode-multiplexing control method performed by the transmission apparatus, the mode-multiplexing control method including measuring data traffic, determining a transmission mode count to be used based on the measured data traffic, and transmitting data to a reception apparatus through an optical line in transmission modes corresponding to the determined transmission mode count.

14 Claims, 9 Drawing Sheets

MODE-MULTIPLEXING CONTROL METHOD, AND TRANSMISSION APPARATUS AND RECEPTION APPARATUS FOR THE SAME

CROSS-REFERENCE TO RELATED APPLICATION(S)

This application claims the priority benefit of Korean Patent Application No. 10-2016-0079583 filed on Jun. 24, 2016, and Korean Patent Application No. 10-2016-0159928 filed on Nov. 29, 2016, in the Korean Intellectual Property Office, the disclosures of which are incorporated herein by reference for all purposes.

BACKGROUND

1. Field

One or more example embodiments relate to a mode-multiplexing control method, and a transmission apparatus and reception apparatus for the same.

2. Description of Related Art

Many existing optical transmission networks use a single-mode fiber (SMF) for transmission in a single mode, whereas mode-division multiplexing based optical transmission networks utilize a few-mode fiber (FMF) for transmission in a few orthogonal transmission modes, thereby increasing a transmission capacity by a factor corresponding to a number of modes.

However, as the number of modes to be used increases, system resources to be used may also increase and a quality of signal per mode may decrease. Further, signal processing for compensating for coupling between modes may be complex. Herein, a scheme of adjusting a mode-multiplexing level based on transmission traffic is suggested.

SUMMARY

An aspect provides an efficient system that adjusts a mode-multiplexing level based on transmission traffic in a mode division multiplexing optical communication system.

Another aspect also provides a mode-multiplexing control method that controls a number of independent data streams to be mode-multiplexed.

According to an aspect, there is provided a mode-multiplexing control method performed by a transmission apparatus, the method including measuring data traffic, determining a transmission mode count to be used based on the measured data traffic, and transmitting data to a reception apparatus through an optical line in transmission modes corresponding to the determined transmission mode count.

The determining may include increasing the transmissions mode count when the measured data traffic increases.

The determining may include adding a transmission mode, starting from a low-order transmission mode when increasing the transmission mode count.

The determining may include decreasing the transmission mode count when the measured data traffic decreases.

The reception apparatus may be configured to verify the determined transmission mode count based on a predetermined signal included in the transmitted data.

The transmitting may include differently incorporating the predetermined signal in each data stream based on the transmission modes.

The transmitting may include activating transmitters of the transmission apparatus based on the determined transmission mode count.

The transmitting may include multiplexing the data based on the transmission modes and transmitting the multiplexed data to receivers of the reception apparatus.

The transmitting may include transmitting the data in different transmission modes using transmitters of the transmission apparatus.

According to another aspect, there is also provided a mode-multiplexing control method performed by a reception apparatus, the method including receiving data transmitted from a transmission apparatus in a transmission mode, verifying a transmission mode count based on the received data, and processing a signal based on the verified transmission mode count. The transmission mode count may be determined by the transmission apparatus based on data traffic.

The mode-multiplexing control method may adjust a mode-multiplexing level based on data traffic such as transmission traffic.

The verifying may include verifying the transmission mode count using a predetermined signal included in the received data.

The verifying may include calculating the transmission mode count based on the predetermined signal and a signal stored in relation to the predetermined signal.

The processing may include activating receivers of the reception apparatus based on the verified transmission mode count.

According to still another aspect, there is also provided a transmission apparatus including a traffic measurer configured to measure data traffic, a transmission mode count determiner configured to determine a transmission mode count to be used based on the measured data traffic, and a data transmitter configured to transmit data to a reception apparatus through an optical line in transmission modes corresponding to the determined transmission mode count.

According to yet another aspect, there is also provided a reception apparatus including a data receiver configured to receive data transmitted from a transmission apparatus in a transmission mode, a transmission mode count verifier configured to verify a transmission mode count based on the received data, and a signal processor configured to process a signal based on the verified transmission mode count. The transmission mode count may be determined by the transmission apparatus based on data traffic.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

The following detailed structural or functional description of example embodiments is provided as an example only and various alterations and modifications may be made to the example embodiments. Accordingly, the example embodiments are not construed as being limited to the disclosure and should be understood to include all changes, equivalents, and replacements within the technical scope of the disclosure.

Terms, such as first, second, and the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

In case it is mentioned that a certain component is "connected" or "accessed" to another component, it may be understood that the certain component is directly connected or accessed to the another component or that a component is interposed between the components. On the contrary, in case it is mentioned that a certain component is "directly connected" or "directly accessed" to another component, it should be understood that there is no component therebetween.

Terms used in the present invention is to merely explain specific embodiments, thus it is not meant to be limiting. A singular expression includes a plural expression except that two expressions are contextually different from each other. In the present invention, a term "include" or "have" is intended to indicate that characteristics, figures, steps, operations, components, elements disclosed on the specification or combinations thereof exist. Rather, the term "include" or "have" should be understood so as not to pre-exclude existence of one or more other characteristics, figures, steps, operations, components, elements or combinations thereof or additional possibility.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

Figure 1:
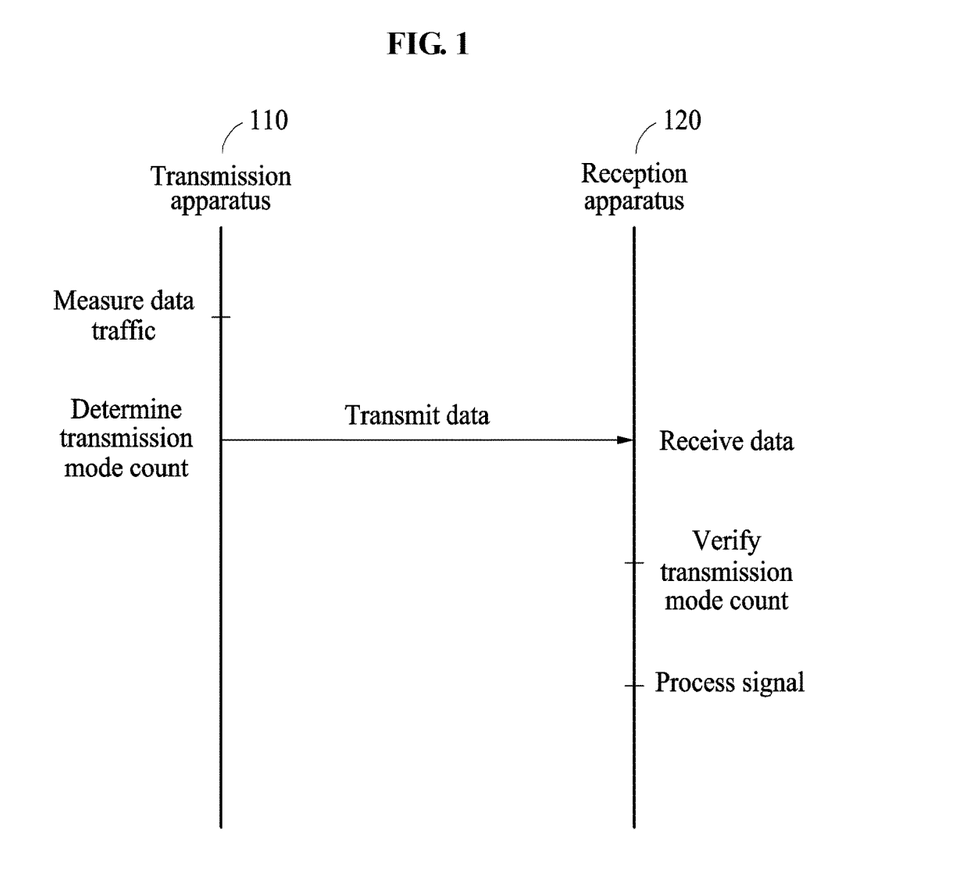
FIG. 1 is a flowchart illustrating a mode-multiplexing control method according to an example embodiment.

FIG. 1 is a flowchart illustrating a mode-multiplexing control method according to an example embodiment.

Referring to FIG. 1, in a mode-multiplexing control method performed by a transmission apparatus 110 or a reception apparatus 120, the transmission apparatus 110 may determine a transmission mode count based on measured data traffic and transmit data, and the reception apparatus 120 may receive the data, verify the transmission mode count, and process a signal.

The transmission apparatus 110 may measure data traffic, and determine a transmission mode count to be used based on the measured data traffic. The transmission apparatus 110 may increase the transmission mode count when the measured data traffic increases. The transmission apparatus 110 may increase the transmission mode count by adding a transmission mode, starting from a low-order transmission mode. Further, the transmission apparatus 110 may decrease the transmission mode count when the measured data traffic decreases. The transmission apparatus 110 may determine the transmission mode count based on a ratio of the measured data traffic and pre-stored maximum transmission data traffic. Further, the transmission apparatus 110 may determine the transmission mode count based on a difference between the measured data traffic and pre-stored average transmission data traffic.

The transmission apparatus 110 may set the transmission mode count based on a total number of mode groups and a total number of modes. It may be assumed that the mode groups include four mode groups, for example, a first mode group, a second mode group, a third mode group, and a fourth mode group, and the modes include six modes, for example, a first mode, a second-first mode, a second-second mode, a third-first mode, a third-second mode, and a fourth mode. The transmission apparatus 110 may set or determine the transmission mode count to be a value, from "4" which is the total and maximum number of mode groups to "6" which is the total and maximum number of modes. The transmission modes may be set at random, or set by preset conditions. The preset conditions may be an order of high quality of mode.

The transmission apparatus 110 may transmit data to the reception apparatus 120 through an optical line in transmission modes corresponding to the determined transmission mode count. The reception apparatus 120 may verify the determined transmission mode count based on a predetermined signal included in the transmitted data. The transmission apparatus 110 may differently incorporate the predetermined signal in each data stream based on the transmission modes. Further, the transmission apparatus 110 may activate transmitters of the transmission apparatus 110 based on the determined transmission mode count. Meanwhile, the data may be multiplexed based on the transmission modes and transmitted to receivers of the reception apparatus 120. The transmitters of the transmission apparatus 110 may transmit data in different transmission modes. The transmitters may transmit data streams based on transmission mode groups. When the transmission mode groups are the same, the transmitters may transmit the same data stream. When the transmission mode groups are different, the transmitters may transmit different data streams.

The reception apparatus 120 may receive the data transmitted from the transmission apparatus 110 in the transmission modes, and verify the transmission mode count based on the received data. The transmission mode count may be determined by the transmission apparatus 110 based on the data traffic. The reception apparatus 120 may verify the transmission mode count using the predetermined signal included in the received data. The reception apparatus 120 may calculate the transmission mode count based on the predetermined signal and a signal stored in relation to the predetermined signal.

The reception apparatus 120 may process a signal based on the verified transmission mode count. The reception apparatus 120 may activate the receivers of the reception apparatus 120 based on the verified transmission mode count.

The data traffic may change greatly even in a day. To guarantee a quality of service (QoS), the mode-multiplexing control method may transmit data when data traffic is at a maximum. However, by controlling a number of modes to be used based on transmission traffic, idle resources of a system may be reduced and the system may be efficiently managed.

Figure 2:
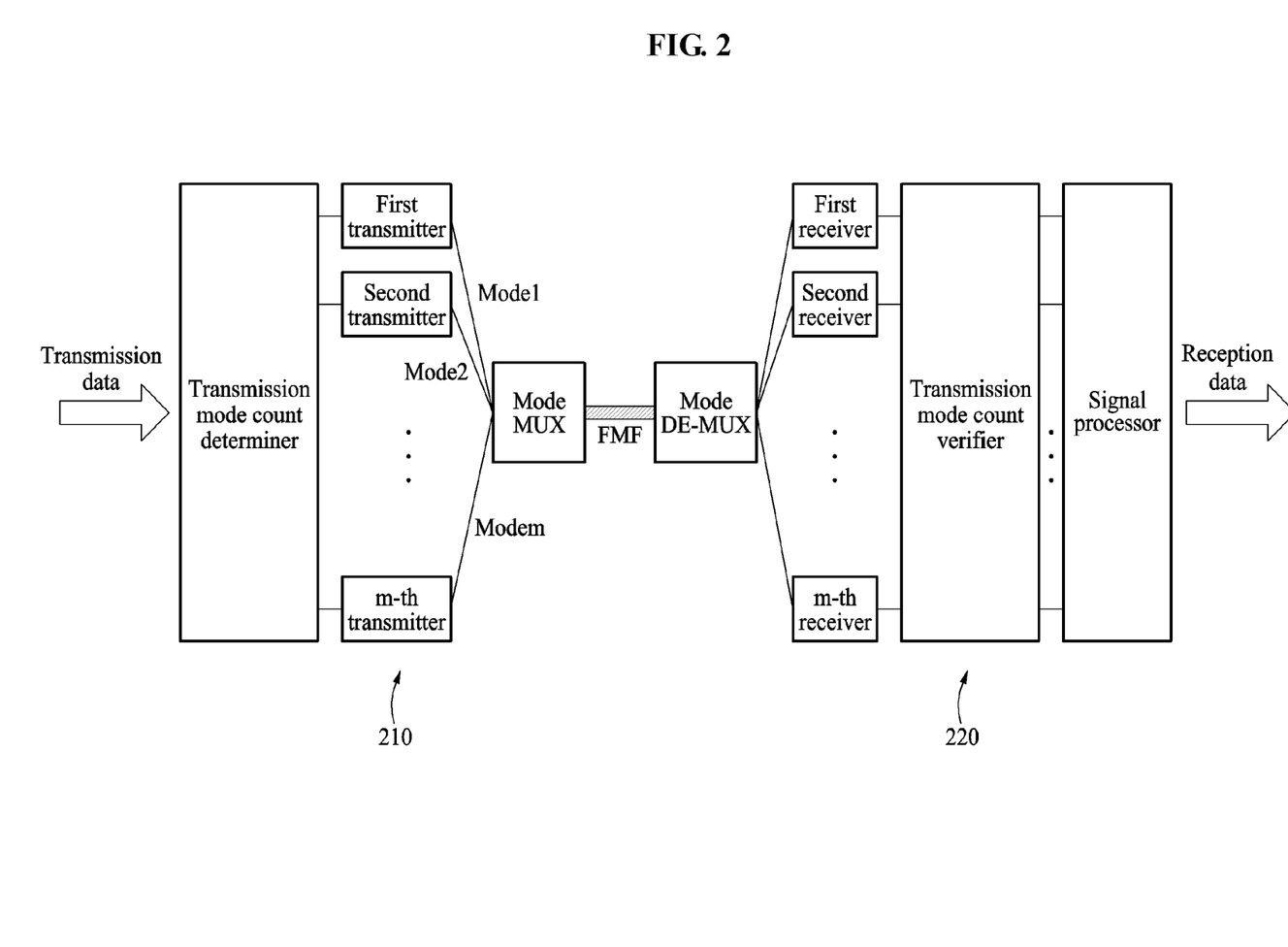
FIG. 2 illustrates a mode-multiplexing control method according to an example embodiment.

FIG. 2 illustrates a mode-multiplexing control method according to an example embodiment.

Referring to FIG. 2, a mode-multiplexing control method performed by a transmission apparatus 210 or a reception apparatus 220 is illustrated. The transmission apparatus 210 may include m transmitters, and the reception apparatus 220 may include m receivers. The transmission apparatus 210 may perform mode multiplexing (MUX) and transmit data using a few-mode fiber (FMF), and the reception apparatus 220 may receive the data by performing mode demultiplexing (DE-MUX) on the mode-multiplexed data.

To increase a data transmission capacity of a saturated optical line, the transmission apparatus 210 or the reception apparatus 220 of a mode-multiplexing optical communication system may perform a mode-division multiplexing based mode-multiplexing control method. An existing optical transmission network uses a single mode among transmission modes of an optical fiber. However, the mode-division multiplexing scheme may utilize an FMF having a few transmission modes. The mode-multiplexing control method may use the FMF, thereby increasing the transmission capacity by a factor corresponding to a number of modes. The mode-multiplexing control method may be combined with a wavelength-division multiplexing optical communication system, and may transmit N×M times data when using M modes for N wavelengths.

The modes existing in the FMF may be classified as a linearly polarized (LP) mode group and modes included in the LP mode group. In several mode groups, modes may be degenerated. The modes may be degenerated because of circular symmetry of an optical fiber. The modes may be separated independently, and thus a signal may be multiplexed and transmitted using a mode-division multiplexing scheme.

In actual signal transmission, traffic may not be constant depending on a time slot, and there may be a time in which the traffic increases and a time in which the traffic decreases. The mode-multiplexing control method may not multiplex data streams corresponding to a number of modes provided by the FMF when the traffic decreases. The mode-multiplexing control method may reduce idle resources and power consumption of the system by adjusting a mode-multiplexing level based on required traffic. The mode-multiplexing level may correspond to a number of independent data streams to be mode-multiplexed.

The mode-multiplexing control method may control a mode count to be used based on the data traffic. The mode-multiplexing control method may utilize only a few modes when the traffic is low, and utilize a number of modes as the traffic increases. The transmission apparatus 210 may control the mode count to be used based on the traffic. The reception apparatus 220 may verify a multiplexing level. Further, the reception apparatus 220 may verify the multiplexing level, and process a signal based on the mode count.

To verify the multiplexing level, the mode-multiplexing control method may use a training symbol. The mode-multiplexing control method may set different training symbols for different data streams including training symbols. The mode-multiplexing control method may calculate a correlation between a prestored signal and a training symbol, thereby verifying a number of types of received training symbols. The mode-multiplexing control method may calculate the mode-multiplexing level based on the verified training symbol.

Figure 3A:
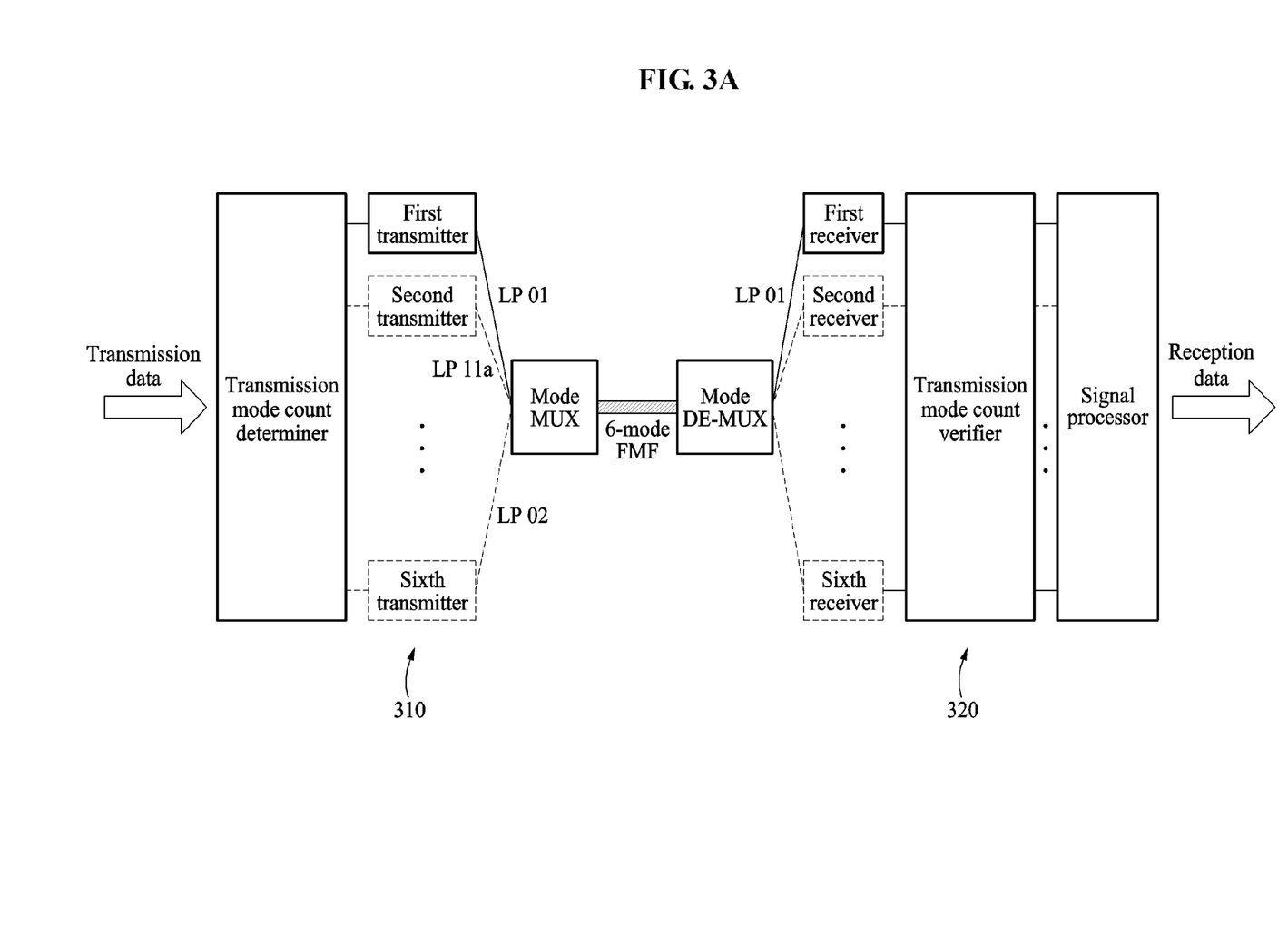
FIG. 3A illustrates a mode-multiplexing control method for lowest transmission traffic according to an example embodiment.

FIG. 3A illustrates a mode-multiplexing control method for lowest transmission traffic according to an example embodiment.

Referring to FIG. 3A, a mode-multiplexing control method may separate a signal with causing little coupling for each mode. For example, when 6 modes are assumed, it may also be assumed that there is no polarization multiplexing for simplification.

The mode-multiplexing control method may use a single mode when traffic is low. The mode-multiplexing control method may utilize an LP01 mode which is a basic mode. In the mode-multiplexing control method, a first transmitter of a transmission apparatus 310 may transmit data in the LP01 mode, and a first receiver of a reception apparatus 320 may receive the transmitted data in the LP01 mode.

Figure 3B:
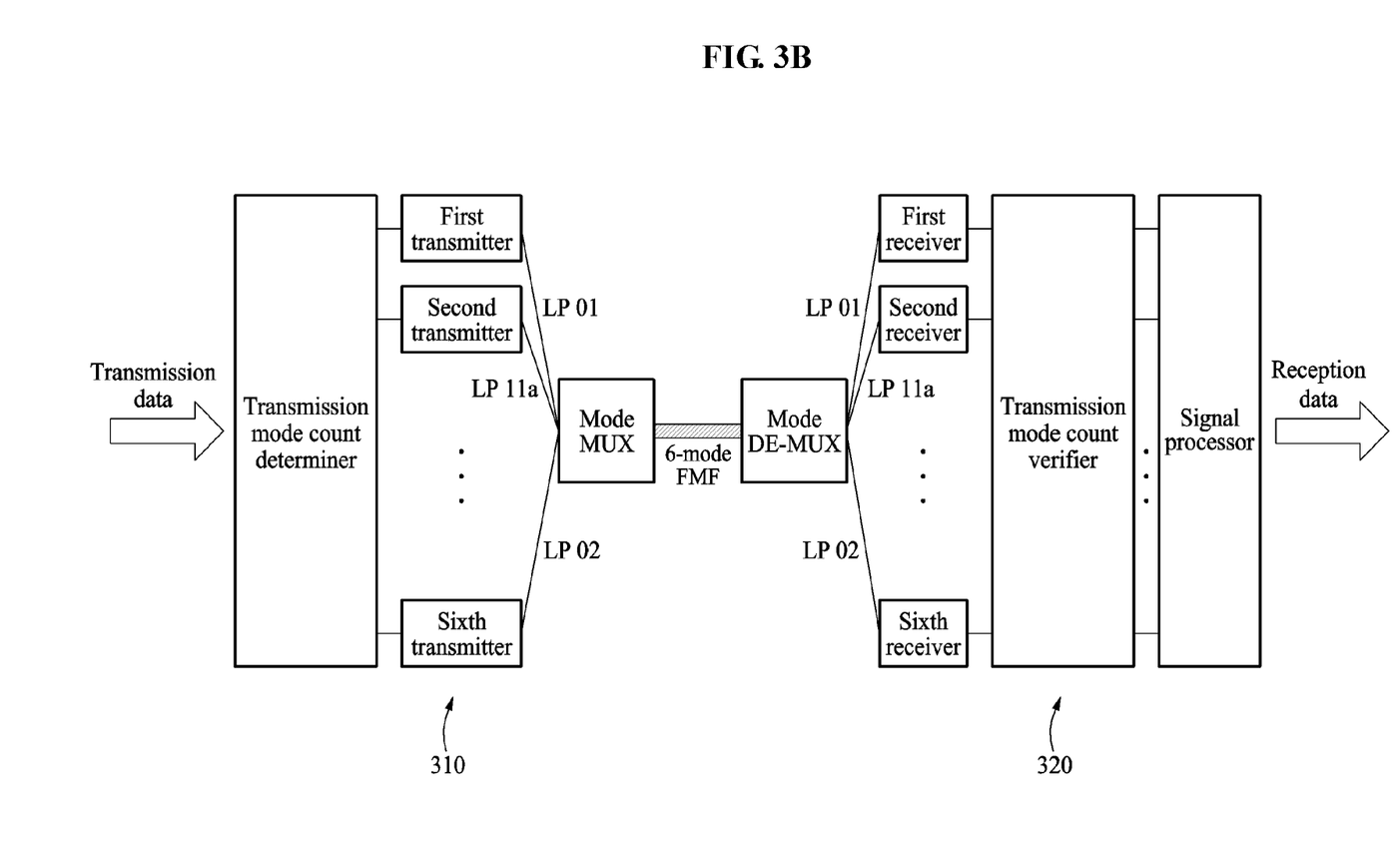
FIG. 3B illustrates a mode-multiplexing control method for highest transmission traffic according to an example embodiment.

FIG. 3B illustrates a mode-multiplexing control method for highest transmission traffic according to an example embodiment.

Referring to FIG. 3B, a mode-multiplexing control method may increase a mode count by "1", starting from a low-order mode, when traffic increases while all other transmitters are turned off. The related mode count may increase in an order from the first transmitter to a sixth transmitter of the transmission apparatus 310.

The mode-multiplexing control method may increase the mode count in an order of LP01, LP11a, LP11b, LP21a, LP21b, and LP02. The reception apparatus 320 may verify a multiplexing level, first activate signal processing of a first receiver which is an LP01 mode receiver, and later increase a number of receivers being activated one by one. The reception apparatus 320 may activate receivers gradually one by one, from the first receiver to the sixth receiver. The reception apparatus 320 may finally activate all m modes. The reception apparatus 320 may activate all the six modes, LP01, LP11a, LP11b, LP21a, LP21b, and LP02.

Figure 4A:
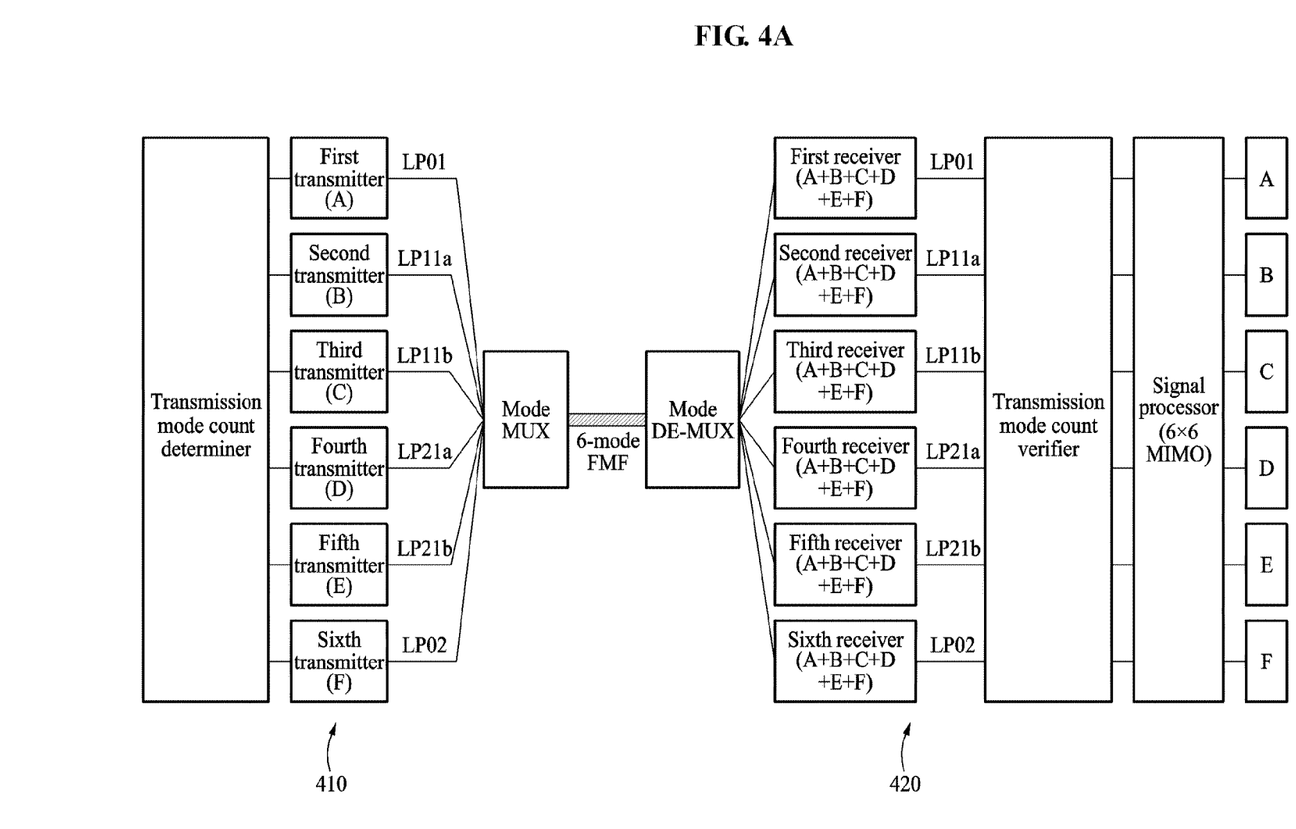
FIG. 4A illustrates a mode-multiplexing control method to which multiple-input and multiple-output (MIMO) for maximum transmission traffic is applied according to an example embodiment.

FIG. 4A illustrates a mode-multiplexing control method to which multiple-input and multiple-output (MIMO) for maximum transmission traffic is applied according to an example embodiment.

Referring to FIG. 4A, to compensate for coupling between modes, a mode-multiplexing control method may apply and process MIMO. The mode-multiplexing control method may use a scheme other than a scheme of turning on or off modes one by one to control a mode-multiplexing level.

The mode-multiplexing control method may be applied to a system using a 6-mode FMF to which MIMO processing is applied due to occurrence of strong coupling between modes, without considering polarization multiplexing. The 6-mode FMF may include a total of six modes, as four mode groups. The four mode groups may include LP01, LP11, LP21, and LP02, and the six modes may include LP01, LP11a, LP11b, LP21a, LP21b, and LP02.

When transmission traffic is high, a transmission apparatus 410 may multiplex six data streams and transmit the data streams to a reception apparatus 420 in all the six modes. A first transmitter through a sixth transmitter may transmit different data streams A through F, respectively, to each of a first receiver through a sixth receiver. The first receiver through the sixth receiver may each receive the data streams A through F.

Figure 4B:
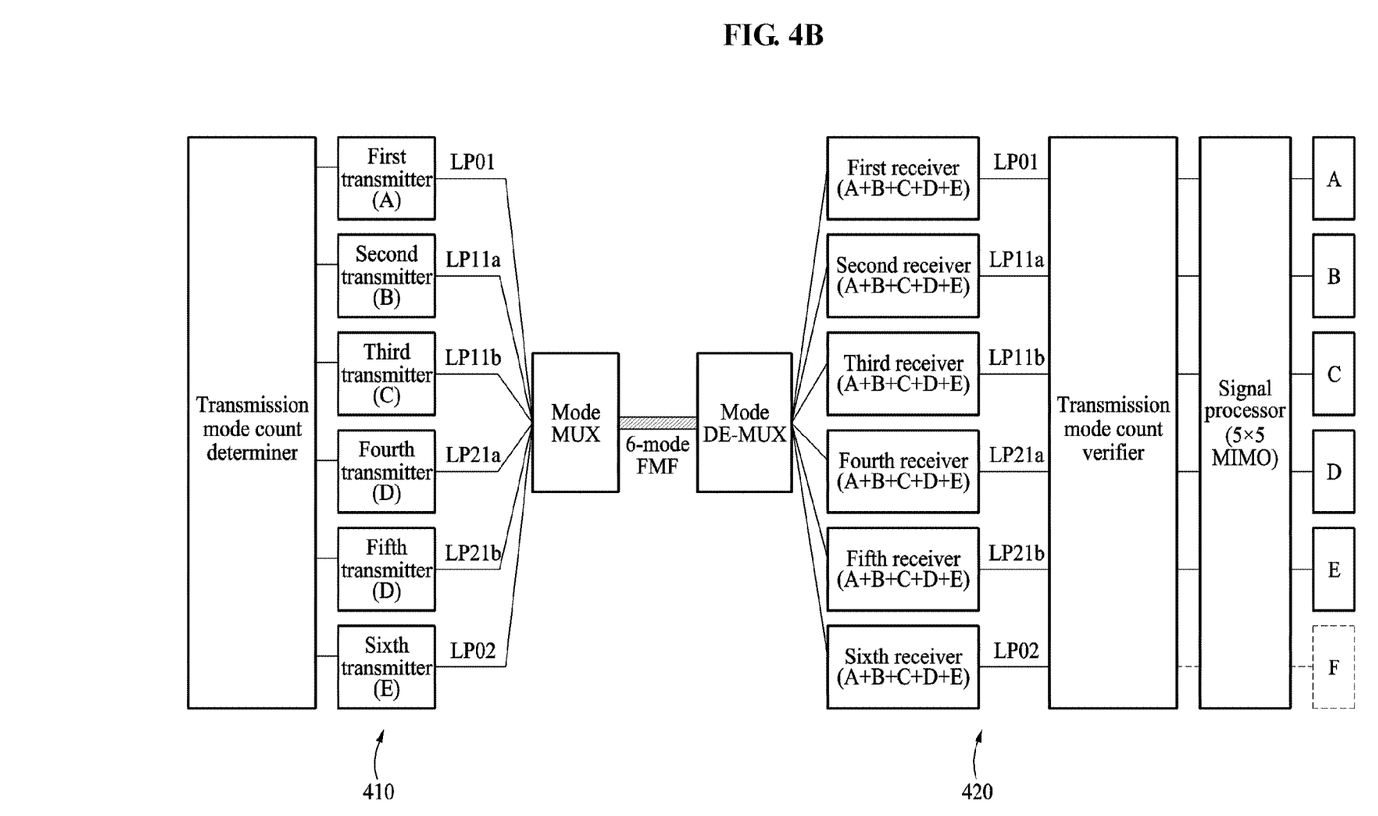
FIG. 4B illustrates a mode-multiplexing control method to which MIMO for intermediate transmission traffic is applied according to an example embodiment.

FIG. 4B illustrates a mode-multiplexing control method to which MIMO for intermediate transmission traffic is applied according to an example embodiment.

Referring to FIG. 4B, when transmission traffic decreases, the transmission apparatus 410 may decrease the multiplexing level by transmitting the same signal in modes of a mode group, starting from a highest-order degenerated mode group.

In a case of a 6-mode FMF, a highest degenerated mode may be an LP21 mode. The mode-multiplexing control method may first transmit the same signal in an LP21a mode and an LP21b mode. The reception apparatus 420 may verify that the mode-multiplexing level decreases, thereby taking one of the signals received in the LP21a mode and the LP21b mode or adding the signals. A first transmitter through a third transmitter, and a sixth transmitter may transmit different data streams A through C, and E, respectively, to each of a first receiver through a sixth receiver. A fourth transmitter and a fifth transmitter which are in the same mode group may transmit the same data stream D to each of the first receiver through the sixth receiver. The first receiver through the sixth receiver may each receive the data streams A through E.

In a case in which a transmission delay difference does not exist between two received signals, the mode-multiplexing control method may add the received signals, thereby averaging noise in the signals received at two receivers and increasing a quality of signal.

The mode-multiplexing control method may combine signals without a great penalty since degenerated modes in the same mode group have the same propagation constant and thus there is no or diminutive transmission delay therebetween. The mode-multiplexing control method may decrease the mode-multiplexing level to "5", thereby applying 5×5 MIMO and deactivating remaining system resources to reduce power consumption.

Figure 4C:
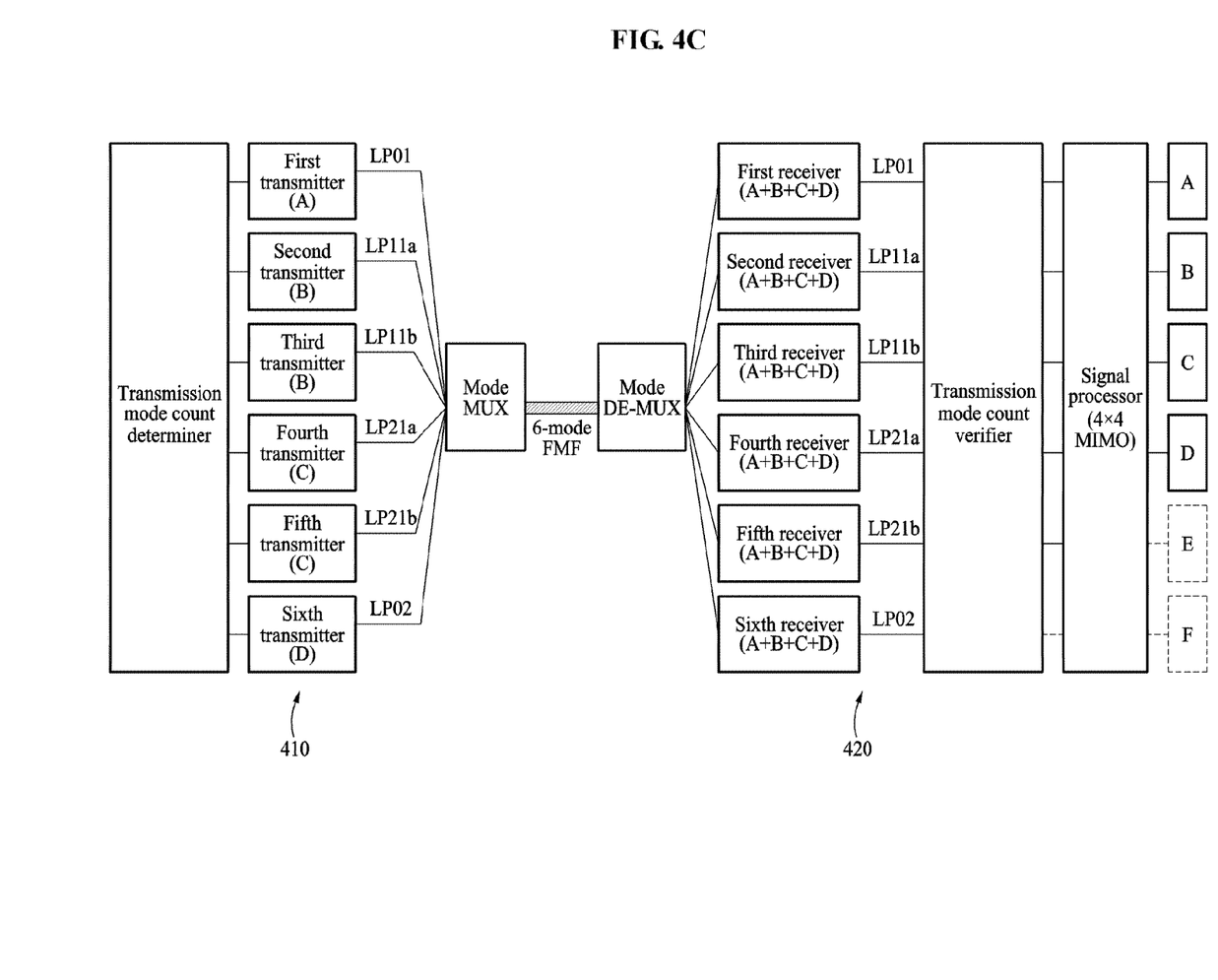
FIG. 4C illustrates a mode-multiplexing control method to which MIMO for lowest transmission traffic is applied according to an example embodiment.

FIG. 4C illustrates a mode-multiplexing control method to which MIMO for lowest transmission traffic is applied according to an example embodiment.

Referring to FIG. 4C, when the transmission traffic additionally decreases, the transmission apparatus 410 may transmit the same signal in an LP11a mode and an LP11b mode which are next-order degenerated modes. The transmitters of the transmission apparatus 410 may transmit different data streams based on mode groups. The first transmitter and the sixth transmitter which are in different mode groups may transmit different data streams A and D, respectively, to each of the first receiver through the sixth receiver. The second transmitter and the third transmitter which are in the same mode group may transmit the same data stream B to each of the first receiver through the sixth receiver. The fourth transmitter and the fifth transmitter which are in the same mode group may transmit the same data stream C to each of the first receiver through the sixth receiver. The first receiver through the sixth receiver may each receive the data streams A through D.

The reception apparatus 420 may verify that the mode-multiplexing level decreases, thereby taking one of the signals received in the LP21a mode and the LP21b mode or adding the signals, or taking one of the signals received in the LP11a mode and the LP11b mode or adding the signals. The mode-multiplexing control method may decrease the mode-multiplexing level to "4", thereby applying 4×4 MIMO and deactivating remaining system resources to reduce power consumption.

The mode-multiplexing control method may adjust the data multiplexing level within a range between the number of mode groups and the number of modes. The mode-multiplexing control method may adjust the multiplexing level within a range of "4" to "6" in a case in which the number of mode groups corresponds to "4" and the number of modes corresponds to "6".

Figure 5:
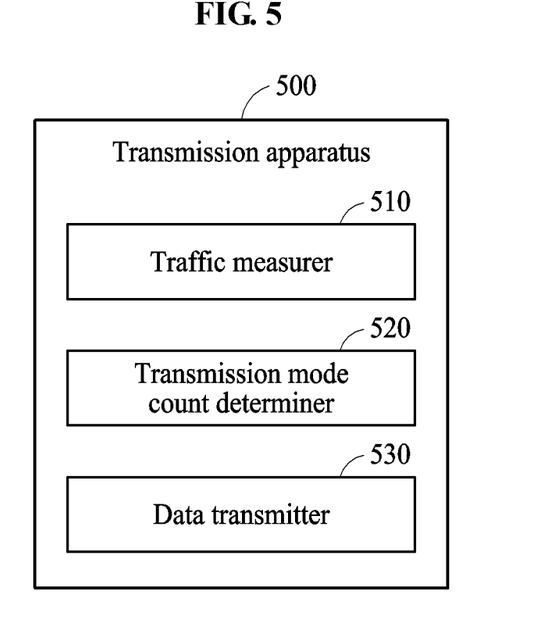
FIG. 5 is a block diagram illustrating a transmission apparatus according to an example embodiment.

FIG. 5 is a block diagram illustrating a transmission apparatus according to an example embodiment.

Referring to FIG. 5, a transmission apparatus 500 may include a traffic measurer 510, a transmission mode count determiner 520, and a data transmitter 530.

The traffic measurer 510 may measure data traffic, and the transmission mode count determiner 520 may determine a transmission mode count to be used based on the measured data traffic.

The data transmitter 530 may transmit data to a reception apparatus through an optical line in transmission modes corresponding to the determined transmission mode count.

Figure 6:
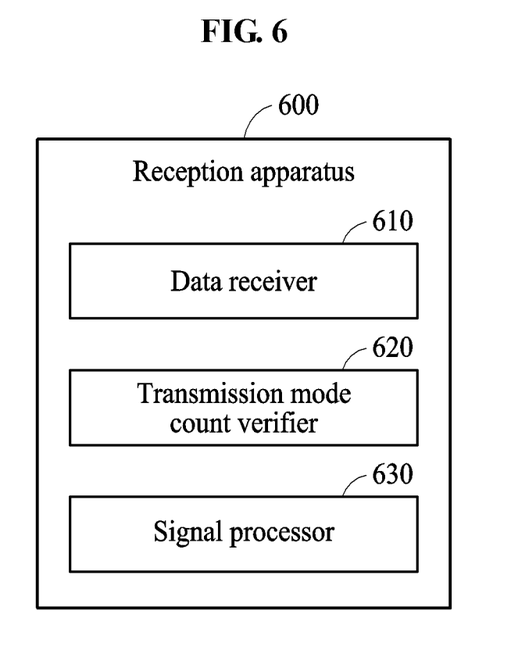
FIG. 6 is a block diagram illustrating a reception apparatus according to an example embodiment.

FIG. 6 is a block diagram illustrating a reception apparatus according to an example embodiment.

Referring to FIG. 6, a reception apparatus 600 may include a data receiver 610, a transmission mode count verifier 620, and a signal processor 630.

The data receiver 610 may receive data transmitted from a transmission apparatus in a transmission mode.

The transmission mode count verifier 620 may verify a transmission mode count based on the received data. The transmission mode count may be determined by the transmission apparatus based on data traffic. The signal processor 630 may process a signal based on the verified transmission mode count.

According to an example embodiment, by adjusting a number of transmission apparatuses to be activated based on a mode-multiplexing level to be used based on traffic demand, system resources such as power may be used efficiently.

According to an example embodiment, by reducing a signal processing complexity of a reception apparatus through adjustment of a mode-multiplexing level to be used based on traffic demand, system resources such as power may be used efficiently.

According to an example embodiment, by considerably reducing a signal processing complexity of a reception apparatus when using MIMO, system resources may be saved greatly.

According to an example embodiment, a mode-multiplexing system may be applied while maintaining an existing optical path.

The components described in the exemplary embodiments of the present invention may be achieved by hardware components including at least one Digital Signal Processor (DSP), a processor, a controller, an Application Specific Integrated Circuit (ASIC), a programmable logic element such as a Field Programmable Gate Array (FPGA), other electronic devices, and combinations thereof. At least some of the functions or the processes described in the exemplary embodiments of the present invention may be achieved by software, and the software may be recorded on a recording medium. The components, the functions, and the processes described in the exemplary embodiments of the present invention may be achieved by a combination of hardware and software.

The processing device described herein may be implemented using hardware components, software components, and/or a combination thereof. For example, the processing device and the component described herein may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A mode-multiplexing control method performed by a transmission apparatus in a mode-division multiplexing optical communication system, the method comprising:
   measuring data traffic;
   determining a number of transmission modes to be used based on the measured data traffic to adjust mode-multiplexing level; and
   transmitting data to a reception apparatus through an optical line in transmission modes corresponding to the determined number of transmission modes.

2. The method of claim 1, wherein the determining, comprises increasing the number of transmission modes when the measured data traffic increases.

3. The method of claim 2, wherein the determining comprises adding a transmission mode, starting from a low-order transmission mode when increasing the number of transmission modes.

4. The method of claim 1, wherein the determining comprises decreasing, the number of transmission modes when the measured data traffic decreases.

5. The method of claim 1, wherein the reception apparatus is configured to verify the determined number of transmission modes based on a predetermined signal included in the transmitted data.

6. The method of claim 5, wherein the transmitting comprises differently incorporating the predetermined signal in, each data stream based on the transmission modes.

7. The method of claim 1, wherein the transmitting, comprises activating transmitters of the transmission apparatus based on the determined number of transmission modes.

8. The method of claim 1, wherein the transmitting comprises multiplexing the data based on the transmission modes and transmitting the multiplexed data to receivers of the reception apparatus.

9. The method of claim 1, wherein the transmitting comprises transmitting the data in different transmission modes using transmitters of the transmission apparatus.

10. A mode-multiplexing control method performed by a reception apparatus in a mode-division multiplexing optical communication system, the method comprising:
    receiving data transmitted from a transmission apparatus in a transmission mode;
    verifying a number of transmission modes based on the received data; and
    processing a signal based on the verified number of transmission modes,
    wherein the number of transmission modes is determined by the transmission apparatus based on data traffic to adjust mode-multiplexing level.

11. The method of claim 10, wherein the verifying comprises verifying the number of transmission modes using a predetermined signal included in the received data.

12. The method of claim 11, wherein the verifying comprises calculating the number of transmission modes based on the predetermined signal and a signal stored in relation to the predetermined signal.

13. The method of claim 10, wherein the processing comprises activating receivers of the reception apparatus based on the verified number of transmission modes.

14. A transmission apparatus in a mode-division multiplexing optical communication system, comprising:
- a traffic measurer configured to measure data traffic;
- a transmission mode count determiner configured to determine a number of transmission modes to be used based on the measured data traffic to adjust mode-multiplexing level; and
- a data transmitter configured to transmit data to a reception apparatus through an optical line in transmission modes corresponding to the determined number of transmission modes.

* * * * *